United States Patent Office 3,488,743
Patented Jan. 6, 1970

3,488,743
PROCESS FOR PRODUCING HIGH IMPACT STRENGTH GRAFT COPOLYMERS WITH LOW MOLECULAR WEIGHT RUBBERS
Massimo Baer, Longmeadow, and Chin H. Lu, West Peabody, Mass., assignors to Monsanto Company, St. Louis, Mo., a corporation of Delaware
No Drawing. Filed June 14, 1966, Ser. No. 557,364
Int. Cl. C08f 19/06, 41/04
U.S. Cl. 260—879                19 Claims

ABSTRACT OF THE DISCLOSURE

A low molecular weight rubbery polymer, a polymerizable monovinylidene monomer formulation and a preformed monovinylidene polymer are admixed to provide a two-phase system wherein the continuous phase comprises a solution of the rubbery polymer in the monomer formulation. The mixture is polymerized en masse to produce grafting and inversion of the phases.

---

The present invention relates to novel polymeric compositions and more particularly to a novel process for producing a graft of a polymeric superstrate upon a rubber of relatively low molecular weight.

As is well known, polymeric compositions containing rubber particles dispersed therein provide certain advantages in physical properties. Generally, it is desirable that the rubber particles be graft copolymers wherein a polymeric chain is grafted onto a preformed rubber substrate so as to modify the nature and properties thereof. Such rubber grafts are particularly advantageous in achieving improved adhesion or compatibility of the rubber particles in certain matrices such as the polyvinyl halides.

Recent observations have indicated that the size of the rubber particles within the matrix may be of great significance in determining the impact strength and other physical properties of the product and the gloss of the product where applicable. In conducting graft polymerization reactions en masse, it has been noted that the size of the rubber particle finally formed is directly proportional to the ratio of the apparent viscosity of the solution of the rubber in the monomer with respect to the apparent viscosity of the solution of the polymer being formed within the monomer. An increase in the ratio tends to produce an increase in rubber particle size. Accordingly, if the molecular weight of the rubber is reduced, generally there will be an effect not only upon the viscosity of the rubber solution but also upon the ratio of viscosities and thereby the size of the rubber particle formed.

Commercial rubbers used for grafting reactions commonly have a molecular weight on the order of 120,000 to 250,000. In certain grafting reactions, rubbers of this molecular weight tend to result in highly viscous mixtures which are difficult to agitate and it is difficult to achieve heat control therein. Accordingly, it would be desirable to employ a lower molecular weight rubber so as to reduce viscosity if it were not for possible reduction in the size of the rubber graft particles produced thereby.

It is an object of the present invention to provide a novel process for graft polymerization of relatively low molecular weight rubbers so as to produce rubber graft partcles of relatively large and stable size.

It is also an object to provide such a process which is readily adapted to variation in the nature of the rubber substrate and polymeric superstrates.

Another object is to provide such a process wherein the polymerizing monomers form both the superstrate for the low molecular weight rubber and a matrix for the graft rubber particles.

Other objects and advantages will be readily apparent from the following detailed specification and claims.

It has now been found that the foregoing and related objects can be readily atained in a process wherein a rubbery polymer having a molecular weight of about 30,000 to 110,000 is admixed with a polymerizable monovinylidene monomer formulation and a monovinylidene polymer to obtain a two-phase system wherein the continuous phase comprises a solution of the rubbery polymer in the vinylidene monomer formulation and the dispersed phase comprises a solution of the vinylidene polymer in the vinylidene monomer formulation. The rubbery polymer comprises 2.0 to 60.0 percent by weight of the admixture and the vinylidene polymer is present in an amount less than the amount required to produce inversion of the phases but not more than 7.0 percent by weight of the combined total of vinylidene polymer and monomer below the amount of the vinylidene polymer required to produce such inversion of the phases. The admixture is then subjected to polymerization conditions to produce graft polymerization of the vinylidene monomer upon the rubbery polymer and to produce inversion of the phases with the solution of the rubbery polymer in the monomer formulation becoming the dispersed phase.

In accordance with the preferred aspect, polymerization en masse of the admixture is terminated before the total polymer content exceeds about 50.0 percent by weight of the total amount of vinylidene monomer and polymer combined within the admixture. The inverted phase admixture is then suspended in an aqueous medium and thereafter subjected to polymerization conditions to produce additional polymerization of the monomer formulation until the desired degree of total polymerization is obtained.

Since the performed polymer does not graft onto the rubber substrate, a portion of the rigid matrix is provided thereby. In some instances, the preformed polymer and the graft superstrate will deviate from the chemical composition of the bulk of the rigid matrix, e.g., compositions wherein a vinyl halide or vinyl ester comprises the rigid matrix. In many other instances, the ratio of rubber to the total of the polymerizable monomer formulation and the preformed polymer can be adjusted so as to provide the bulk of the rigid matrix through the polymerization of monomer in excess of that required for the grafting reaction. However, even where the preformed polymer and graft superstrate are substantially identical in composition to the desired rigid matrix, it may be advantageous to mechanically blend the product of the process of the present invention with additional polymeric material to provide all or a part of the matrix. Thus, it can be seen that the present invention can be utilized for preparing large particle rubber grafts which may then be admixed with rigid matrices of the type in which the ungrafted rubber would normally be incompatible, as well as compatible or identical matrices.

THE RUBBER SUBSTRATE

Various rubbers onto which the polymerizable monomer formulation may be grafted during polymerization in the presence thereof are utilizable as the substrate of the graft copolymer including diene rubbers, natural rubbers, ethylene-propylene rubbers, ethylene-propylene terpolymer rubbers, acrylate rubbers, polyisoprene rubbers and mixtures thereof, as well as interpolymers thereof with each other or other copolymerizable monomers.

The effectiveness of a particular rubber as a substrate will vary with the nature of the polymerizable monomer formulation. For example, it is known that the diene rubbers have a retarding effect upon the polymerization of vinyl halides and vinyl esters so that grafting thereof onto diene rubber generally is not practical. However, the vinyl halides and vinyl esters may be used more advantageously with ethylene-propylene terpolymers providing pendant unsaturation, and may also be utilized with the various other rubbers with varying effectiveness of grafting efficiency by raising the temperature and the amount of peroxide catalyst provided.

The preferred rubbers are diene rubbers or mixtures of diene rubbers, i.e., any rubbery polymers (a polymer having a second order transition temperature not higher than 0° Centigrade, preferably not higher than −20° Centigrade, as determined by ASTM Test D–746–52T) of one or more conjugated, 1,3-dienes, e.g., butadiene, isoprene, piperylene, chloroprene, etc. Such rubbers include homopolymers of conjugated 1,3-dienes with up to an equal amount by weight of one or more copolymerizable monoethylenically unsaturated monomers, such as monovinyldene aromatic hydrocarbons (e.g., styrene; an aralkylstyrene, such as the o-, m- and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl-acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g, vinyl acetate, vinyl stearate, etc.); vinyl vinylidene halides (e.g., the vinyl and vinylidene chlorides and vinylidene chlorides and bromides, etc.); and the like.

Although the rubber may contain up to about 2.0 percent of a cross-linking agent, based on the weight of the rubber-forming monomer or monomers, cross-linking may present problems in dissolving the rubber in the monomers for the graft polymerization reaction. In addition, excessive cross-linking can result in loss of the rubbery characteristics. The cross-linking agent can be any of the agents conventionally employed for cross-linking dienerubbers, e.g. divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

However, cross linking of the rubber graft is desirable to preserve proper morphology of the particles thus produced. Accordingly, cross linking during the grafting reaction is advantageous and inherent cross linking can be further encouraged through the variation of graft polymerization conditions as is well known in the art. Thus, rubber graft particles of spherical form and proper size may be obtained and maintained even during mechanical processing to achieve the desired dispersion thereof in the rigid matrix when such a technique is employed.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene), and unsaturated nitriles (e.g., acrylonitrile), or mixtures thereof. Particularly advantageous subtrates are butadiene homopolymer or an interpolymer of 90.0 to 95.0 percent by weight butadiene and 5.0 to 10.0 percent by weight of acrylonitrile or styrene.

In accordance with the present invention, the rubber will have a molecular weight of about 30,000 to 110,000, the viscosity of the formulations produced by dissolving the rubber in the monomers being reduced as the molecular weight of the rubber is reduced so as to permit use of variations heretofore not practical. However, for most purposes, the rubber will preferably have a molecular weight on the order to 50,000 to 80,000.

POLYMERIZABLE MONOMER FORMULATION

As previously indicated, the polymerizable monomer formulation consists essentially of one or more monovinylidene monomers. Exemplary of such monovinylidene monomers are unsaturated nitriles, such as acrylonitrile and methacrylonitrile; vinyl halides, such as vinyl chloride, vinyl bromide, etc.; vinylidene halides, such as vinylidene chloride, vinylidene bromide, etc.; alpha- or beta-unsaturated monobasic acids and derivatives thereof, such as acrylic acid, methyl acrylate, ethyl acrylate, butyl acrylate, 2-ethylhexyl acrylate, methacrylic acid and the corresponding esters thereof; acrylamide, methacrylamide; vinyl esters such as vinyl acetate, vinyl propionate, etc., dialkyl maleates or fumarates such as dimethyl maleate, diethyl maleate, dibutyl maleate, the corresponding fumarates, etc.; monovinylidene aromatic hydrocarbons such as styrene; alpha-alkyl monovinylidene monoaromatic compounds, e.g., alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc., ring-alkyl, ring-halosubstituted styrenes, e.g., 2-chloro-4-methylstyrene, 2,6-dichloro-4-methylstyrene, etc.; vinyl naphthalene; vinyl anthracene etc. The alkyl substituents generally have one to four carbon atoms and may include isopropyl and isobutyl groups.

The preferred polymerizable monomer formulations contain monovinylidene aromatic hydrocarbons. Although the amount of the monovinylidene aromatic hydrocarbon may vary widely depending upon the desired composition of the superstrate and matrix, generally it will be included in an amount of at least 10.0 percent by weight of the total polymerizable monomer formulation and preferably at least 50.0 percent by weight.

A particularly advantageous commercial formulation consists at least principally of a monovinylidene aromatic hydro carbon and an unsaturated nitrile, i.e., such monomers comprise at least 50.0 percent by weight and preferably at least 75.0 percent by weight of the monomers. Illustrative of such a commercial formulation is one containing 20.0 to 95.0 percent, and preferably 60.0 to 85.0 percent by weight, of the monovinylidene aromatic hydrocarbon, and 80.0 to 5.0 percent, and preferably 40.0 to 15.0 percent by weight, of the unsaturated nitrile. However, the particular monomer formulation selected will depend upon the rigid matrix and the properties desired from the rubber graft and total composition.

THE PREFORMED POLYMER

The chemical composition of the preformed polymer should be essentially identical to the composition of the polymerizable monomer formulation, although some deviations may be tolerable and advantageous for certain applications. Similarly, the molecular weight of the preformed polymer should desirably closely approximate the molecular weight of the polymer produced from the polymerizable monomer formulation during polymerization thereof, although it may be advantageous under some circumstances to employ a variation therein for the effect upon viscosity. Reduction in molecular weight of the preformed polymer will tend to influence the particle size of the rubber particle by variation in the relative viscosity of the two phases.

In some processes, the ratio of the monomers in the polymerizable formulation will deviate from the ultimate composition of the polymer produced therefrom since occasionally it may be advantageous to add one or more of the monomers intermittently during the polymerization reaction. Generally, the preformed polymer should have a composition which closely approximates the polymer to be produced from the polymerizable monomer formulation so that its composition may vary from the ratio of monomers present in the formulation at the time of mixing thereof despite the intent to match the two polymers.

THE MATRIX

As previously indicated, the matrix preferably has a chemical composition closely approximating that of the polymer of the superstrate produced by the polymerizable monomer formulation. However, the rubber graft and preformed polymer produced by the present invention may be admixed with a separate polymeric matrix in which they are compatible. Thus, the product of the present invention may be mechanically blended with a matrix polymer which may be either additional polymer of the same or similar formulation or a distinct polymer as, for example, a vinyl halide matrix into which is blended a rubber graft with styrene-methacrylate or styrene-acrylonitrile.

THE GRAFT POLYMERIZATION PROCESS

In the graft polymerization process, the preformed rubber substrate generally is dissolved or dispersed in the the ratio of monomer formulation to rubber substrate and the polymerization conditions, it is possible to produce both the desired degree of grafting onto the rubber substrate and the polymerization of ungrafted polymer to provide a portion of the matrix at the same time. Generally, the ratio of polymerizable monomer formulation to rubber charged to the graft polymerization reaction will be the primary determinant of the superstrate:substrate ratio of the resultant rubber graft. However, conditions of polymerization, rubber chemistry and particle size, delayed monomer addition, chain transfer agents, etc. may also assert an effect.

As is well known in the art, in graft polymerization en masse the continuous phase initially is comprised of a solution of the rubber in the polymerizable monomer formulation and the dispersed phase is initially comprised of a solution of the polymer being formed in the polymerizable monomer formulation. At some point during polymerization, which can be readily determined by observation of a laboratory reaction involving the polymers, the two phases invert with the solution of the polymer in the polymerizable monomer formulation becoming the continuous phase and the solution of the rubber in the polymerizable monomer formulation becoming the dispersed phase.

In the process of the present invention, the preformed polymer, polymerizable monomer formulation and preformed rubber substrate are admixed and polymerized initially en masse until phase inversion has occurred, and preferably therebeyond. The maximum polymerization which may be conducted en masse will normally be limited by the equipment employed and the viscosity of the resultant formulation. Generally, mass polymerization will be terminated at a point wherein the polymeric content (exclusive of rubber) constitutes 20.0 to 50.0 percent by weight of the combined total of the polymerizable monomer formulation and monovinylidene polymer, and the syrup produced thereby is thereafter suspended in water to complete polymerization.

The preformed monovinylidene polymer is added in an amount less than that required to produce irreversible inversion of the two phases but not more than about 7.0 percent by weight of the combined total of the preformed monovinylidene polymer and monomer formulation below that amount of the monovinylidene polymer required to produce such inversion. As is known, phase inversion occurs over a range of conversion, and the preferred process of the present invention utilizes an amount of polymer less than that required to produce any significant evidence of phase inversion even though reversible. Preferably, the preformed polymer is present in an amount not less than 4.0 percent by weight of the combined total below that amount of polymer required to produce phase inversion, and, most desirably, less than 2.0 percent by weight therebelow. Although it may be present in an amount only slightly below that required for phase inversion, greatest benefit from the present invention is obtained by a minor amount of polymerization prior to phase inversion so that the optimum addition of monovinylidene polymer is within the range of 2.0 to 0.5 percent by weight below the amount thereof required to produce phase inversion. The point of phase inversion for a given admixture of rubbery polymer and monomer formulation can be determined by laboratory reaction at conditions equivalent to those desired in larger equipment.

As a specific example, in a grafting reaction using styrene and acrylonitrile monomers, phase inversion generally will occur when the vinylidene polymer equals about 15.0 to 20.0 percent by weight of the combined total of the preformed monovinylidene polymer and remaining monomers in the formulation. For such a reaction, the preformed monovinylidene polymer required in accordance with the present invention will generally fall within the range of about 10.0 to 19.0 percent by weight of the combined total of the monovinylidene polymer and monomer formulation.

The effect of the preformed monovinylidene polymer is not fully understood. Although applicants do not wish to be bound by any theory of operation, it is believed that the preformed polymer not only produces a variation in the ratio of the viscosities of the two phases but also produces less disturbance of the interface of the two phases since there is no or very little monovinylidene polymer in the dispersed rubber globule after phase inversion which would tend to migrate into the continuous phase provided by the solution of monovinylidene polymer in monomer formulation.

In addition, it is believed that the addition of the preformed monovinylidene polymer to a point closely below that of phase inversion produces a highly beneficial effect upon the interfacial tension of the two phases. When the phases invert, there is a lesser tendency for the dispersed rubber in monomer globules to be diminished in size, presumably by passage of monomer from the globule into the continuous phase. A minor amount of grafting prior to phase inversion is considered beneficial to stabilize the dispersed rubber globules at and after phase inversion although a high degree of grafting prior to phase inversion should be avoided since it leads to reduced interfacial tension and reduced particle size. The grafted rubber particles thus formed tend to retain the desired spherical form throughout the further polymerization and any subsequent mechanical processing.

After the polymerization process has been carried to the desired point en masse, the admixture is then stirred with water in the presence of a suspending agent to produce an aqueous suspension thereof. Further polymerization of the monomer formulation is then conducted in suspension until the desired degree of total polymerization has been attained. Thereafter, the unreacted monomers and volatile components are stripped and the polymer beads are recovered by contrifuging, washed and dried.

Normally, the mass polymerization reaction will be conducted in a suitable reactor by heating the admixture at a temperature of about 75 to 125° centigrade over a period of about one to forty-eight hours at a pressure of 1–100 pounds per square inch with conventional stirring to aid heat transfer during reaction. The time for this partial polymerization en masse will vary depending upon the catalyst, temperature and pressure employed and the particular monomers in the monomer formulation and the ratio thereof.

Any free radical generating catalyst may be used in the practice of this invention, including actinic radiation. It is preferable to incorporate a suitable catalyst system for polymerizing the monomers such as the conventional monomer-soluble peroxy compounds. Exemplary of such catalysts are di-tert-butyl peroxide, benzoyl peroxide, oleyl peroxide, toluyl peroxide, di-tert-butyl diperphthalate, tert-butyl peracetate, tert-butyl perbenzoate, dicumyl peroxide, tert-butyl hydroperoxide isopropyl percarbonate, 2,5-di-methyl-2,5-di(tert-butylperoxy)-hexyne-3-tert - butyl hydroperoxide, cumene hydroperoxide, p-menthane hydroperoxide, cyclopentane hydroperoxide, diisopropyl benzene hydroperoxide, p-tert-butylcumene hydroperoxide, pinane hydroperoxide, 2,5 - dimethylhexane-2,5-dihydroperoxide, etc., and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle. However, larger amounts of catalyst will be desirable where the rubber has an inhibiting effect upon the polymerization of the monomer formulation.

As is well known, it is often desirable to incorporate molecular weight regulators such as mercaptans, halides and terpenes in relatively small percentages by weight, on the order of 0.001 to 2.5 percent by weight of the polymerizable material. In addition, it may be desirable to include relatively small amounts of antioxidants or stabilizers such as the conventional alkylated phenols, although these may be added during or after polymerization.

Various suspending agents may be employed to achieve the desired suspension such as the acrylic acid-acrylate interpolymers of U.S. Patent No. 2,945,013, granted July 12, 1960, and U.S. Patent No. 3,051,682, granted Aug. 28, 1962. Seondary dispersing aids may be added to obtain the desired suspension of the partially polymerized syrup in water. The suspending agent is desirably added to the water, although it may be added to the monomers ab initio or during initial polymerization.

The conditions for the suspension polymerization will vary depending upon the monomer formulation. Generally, however, the suspension is subjected to stirring to assist heat transfer and heated at a temperature of about 75 to 200° centigrate for a period of one to forty-eight hours to obtain substantially complete polymerization of the monomers therein. Preferably, such further polymerization with styrene-acrylonitrile type monomer formulations is carried out at a temperature of about 100 to 170° centigrade for a period of one to twenty hours depending upon the catalyst and the amount thereof employed.

It is possible and sometimes desirable to include in the initial admixture inert fillers, antioxidants, stabilizers and other components. In both the mass and suspension polymerization processes, additional monomers, catalyst and other components may be introduced into the polymerizable formulation at various stages of polymerization if so desired. In providing the initial admixture, the polymerizable monomer formulation may be subjected to polymerization en masse in the absence of rubber so as to provide the desired amount of preformed polymer; thereafter, the rubber is admixed therewith. Alternatively, the preformed polymer and rubber may be admixed with polymerizable monomer formulation so as to obtain the desired solution thereof.

Regardless of the technique employed to obtain the desired initial admixture, the mixing should not be excessive since this would tend to break down the particle size of the rubber. Similarly, the mixing employed during the mass and suspension polymerization reactions should not be excessive so as to reduce substantially the particle size of the rubber dispersion and resultant rubber graft.

As a result of the process of the present invention, rubber grafts having a particle size of about 0.7 to 20.0 microns may be obtained. Generally, the preferred rubber particles will have a size of about 1.0 to 5.0 microns for most formulations.

THE FINAL COMPOSITION

As previously indicated, the ratio of the preformed rubber to the preformed polymer and polymerizable monomer formulation may be such that the polymerization in accordance with the present invention will produce not only the desired degree of grafting but also the rigid matrix with the ratio between the rubber and matrix being that desired. For most purposes, the rubber content in the total final composition may vary from as little as 1.0 percent to as much as 10.0 percent by weight of the rubber graft. Generally, an increase in rubber content will increase the impact strength of the composition, but it also rapidly increases the viscosity of the blend produced therefrom and decreases the tensile stress at yield and fail and the tensile modulus. Accordingly, the preferred compositions will contain about 10.0 to 50.0 percent by weight of the rubber graft and most desirably about 10.0 to 40.0 percent by weight.

Thus, it will be advantageous in many instances to admix the polymerization product of the present invention with a preformed polymer to achieve the desired ultimate composition. As previously pointed out, the polymer with which the product of the process of the present invention is admixed may be the same in chemical composition or it may be of a composition with which the product matrix is compatible. Such mechanical blending may be accomplished by any of the well-known techniques such as mill blending.

Exemplary of the efficacy of the present invention are the following detailed examples in which all parts are parts by weight unless otherwise indicated.

EXAMPLE ONE

In a reaction vessel were stirred together 8.0 parts of a butadiene homopolymer having a molecular weight of about 94,000 and 92.0 parts of styrene monomer. The admixture also contained 0.1 part di-tert-butyl peroxide, 0.05 part tert-dodecyl mercaptan, and minor amounts of antioxidant and mineral oil.

Polymerization en masse was conducted to approximately 30.0 percent conversion and the syrup thus produced was thereafter admixed with 425.0 parts of water and a suspending agent formulation provided by 0.5 part of an interpolymer of 95.5 mol percent acrylic acid and 4.5 mol percent 2-ethylhexyl acrylate, 0.3 part calcium chloride and 1.0 part of the condensation product of naphthalene sulfonic acid and aldehyde sold by R. T. Vanderbilt under the trademark DARVAN. The suspension was stirred and initially heated to about 100° centigrade; thereafter, it was heated with stirring to about 155° centigrade for a polymerization cycle rate of about four hours and at a pressure of about 75 to 90 pounds per square inch. Thereafter, the batch was cooled, centrifuged, washed and dried to recover the polymerized product in the form of small spherical beads. The beads recovered from the polymerization process contained about 8.0 percent by weight rubber which had been grafted to a superstrate:substrate ratio of 170:100, and the rubber particles had a diameter of 0.4 to 2.0 microns with an average size of about 0.8 micron.

Thereafter, 81.5 parts of the beads thus produced were blended with 18.5 parts of polystyrene homopolymer, 0.3 part of an alkylated phenol antioxidant and 0.2 part of a stearate soap lubricant to provide a composition containing about 6.5 percent by weight rubber. An extruded specimen produced therefrom was found to have a rough surface and tensile strengths at yield of 2420 pounds per square inch and at fail of 2220 pounds per square inch. The elongations at yield were 3.0 percent and at fail 21.0 percent. The Izod impact value was only about 1.5 foot pounds per inch despite the rough surface condition which is generally characteristic of enhanced toughness at sacrifice of appearance.

EXAMPLE TWO

The process of Example One was substantially repeated except that the butadiene homopolymer was admixed with 78.2 parts of styrene monomer and 13.8 parts of prepolymerized polystyrene. The small spherical beads obtained from this process were found to have a diameter of about 1.0 to 7.0 microns with an average size of about 2.0 microns.

When blended with additional polystyrene homopolymer, the specimens were found to have a smooth, desirable and attractive surface. The tensile strengths at yield were 3100 pounds per square inch and at fail 3480 pounds per square inch. The elongation at yield was 2.6 percent and at fail was 34.0 percent. The Izod impact value was 1.35 foot pounds per inch. Thus, it can be seen that the incorporation of the preformed styrene polymer significantly increases the size of the rubber particle and gives a desirable balance of properties in the resultant compositions while providing a highly desirable surface appearance.

EXAMPLE THREE

The process of Example One was substantially repeated except that the rubbery polymer was admixed with 27.6 parts of prepolymerized sytrene homopolymer and 64.4 parts of styrene monomer. Phase inversion was produced by the addition of this amount of polymer and the rubber in monomer solution became the dispersed phase.

After polymerization in suspension, the rubber particle size was found to be 2.0 to 20.0 microns with an average of about 10.0 microns. Some phase reinversion was observed, and the rubber particles were found to be irregular in shape. The moldings produced from the composition were found to have a poor, unattractive surface.

EXAMPLE FOUR

The process of Example Two was substantially repeated again using a rubber having a molecular weight of about 94,000 and about 13.8 parts of polystyrene and 78.2 parts of styrene monomer. In this particular test, the graft particles ranged in diameter from about 1.0 to 11.0 microns and had an average diameter of about 3.0 microns.

The moldings produced therefrom had a smooth surface and a tensile strength at fail of 2190 pounds per square inch and an elongation at fail of 23.0 percent.

EXAMPLE FIVE

The effects of varying particle size of the graft in the final composition and the molecular weight of the rubber substrate upon physical properties are set forth in the following table:

vinylidene polymer upon the particle size of the graft in the final blend are set forth in the following table:

COMPARISON OF GRAFT PARTICLE SIZE AS OBTAINED BY NORMAL POLYMERIZATION AND BY PREMIXING PREFORMED POLYMER

| | Graft Particle Size in Microns | |
| --- | --- | --- |
| | Normal Polymerization | Premixing Technique |
| Molecular weight of rubber: | | |
| 63,000 | 0.2–0.4 (avg.=0.3) | 0.5–5 (avg.=2) |
| 83,000 | 0.4–1.0 (avg.=0.6) | 2–8 (avg.=2) |
| 93,000 | 0.5–1.0 (avg.=0.7) | 1–4 (avg.=2) |
| 155,000 | 2–5 (avg.=2) | 2–12 (avg.=5.5) |

Thus, it can be seen from the foregoing detailed specification and specific examples that the present invention provides a novel process for graft polymerization enabling the utilization of rubbers of relatively low molecular weight so as to produce rubber grafts of relatively large and stable particle size. In this manner, it is possible to use monovinylidene polymers of higher molecular weight with considerably less difficulty and to obtain products having a smooth and attractive surface finish. The use of low molecular weight rubbers offers advantages in that solutions of greatly reduced viscosity can be obtained with resultant improvements in heat transfer, power consumption and increases in the rate of polymerization. By use of the lower molecular weight rubbers to obtain lower viscosity solutions, it is thus possible to increase the total rubber content of the final compositions so as to obtain enhancement of the properties provided by the rubber graft.

Having thus described the invention, we claim:

1. In a process for producing a graft interpolymer of a monovinylidene compound upon a rubber substrate, the steps comprising admixing a graftable rubbery polymer containing a rubber-forming diene monomer and having a molecular weight of about 30,000 to 110,000 with a polymerizable monovinylidene monomer formulation and a monovinylidene polymer to obtain a two phase system wherein the continuous phase comprises a solution of the rubbery polymer in the vinylidene monomer formulation and the dispersed phase comprises a solution of the monovinylidene polymer in the vinylidene monomer formulation, said rubber polymer comprising 2.0 to 60.0 percent by weight of the admixture and said monovinylidene polymer being present in an amount less than the amount thereof required to produce irreversible inversion of said phases but not more than 7.0 percent by weight of the combined total of said monovinylidene polymer and monomer formulation below said amount of said polymer required to produce inversion of said phases, said monovinylidene monomer formulation and monovinylidene polymer being comprised of at least principally monomers selected from the group consisting of ethylenically unsaturated nitriles, vinyl halides, vinylidene

PROPERTIES OF INJECTION MOLDED SPECIMENS

| | Surface [1] gloss rating | Graft particle av. size (microns) | Tensile strength, p.s.i. | | Elongation, percent at fail | Izod impact, ft. lb./in. |
| --- | --- | --- | --- | --- | --- | --- |
| | | | Yield | Fail | | |
| Molecular weight: | | | | | | |
| 151,000 | 4 | 3.0 | 2,640 | 3,180 | 47 | 1.47 |
| 93,000 | 4 | 0.8 | 3,130 | 3,310 | 46 | 1.75 |
| 63,000 | 2 | 0.3 | 3,560 | 3,280 | 23 | 0.69 |
| 82,000 | 1 | 0.6 | 3,230 | 3,030 | 35 | 1.23 |
| 207,000 | 3 | 4.5 | 2,420 | 3,430 | 58 | 1.32 |

EXAMPLE SIX

The effects of varying the molecular weight of the rubber substrate and of incorporating preformed monohalides, alpha- and beta-unsaturated monobasic acids and derivatives thereof, vinyl esters, dialkyl maleates, dialkyl fumarates, monovinylidene aromatic hydrocarbons, ring-substituted alkyl styrenes, ring-substituted halostyrenes, ring-alkyl-, ring-halo-substituted styrenes and mixtures thereof; and subjecting said admixture to polymerization en masse to produce graft polymerization of said monovinylidene monomer upon said rubbery polymer and to produce inversion of said phases with said solution of the rubbery polymer in the monomer formulation becoming the dispersed phase and having a particle size of about 0.7 to 20.0 microns, said polymerization being conducted with control of agitation so as to avoid any substantial reduction of particle size of the rubber dispersion and graft copolymer.

2. The process of claim 1 wherein said monovinylidene monomer formulation and monovinylidene polymer contain a monovinylidene aromatic hydrocarbon.

3. The process of claim 1 wherein said polymerizable monovinylidene monomer formulation and monovinylidene polymer consist at least principally of a monovinylidene aromatic hydrocarbon and an monoethylenically unsaturated nitrile.

4. The process of claim 2 wherein said monovylindene aromatic hydrocarbon is styrene.

5. The process of claim 3 wherein said unsaturated nitrile is acrylonitrile.

6. The process of claim 1 wherein said rubbery polymer contains at least 75 percent by weight of a conjugated 1,3-diene.

7. The process of claim 3 wherein said monovinylidene aromatic hydrocarbon and unsaturated nitrile comprise at least 75 percent by weight of the polymerizable formulation and monovinylidene polymer.

8. The process of claim 1 wherein the rubbery polymer is admixed with a partially prepolymerized monovinylidene monomer formulation providing both said polymerizable monovinylidene monomer formulation and said monovinylidene polymer.

9. The process of claim 1 wherein said monovinylidene polymer is present in an amount of about 0.5 to 4.0 percent by weight of the admixture below the amount required of said polymer to produce inversion of said phases.

10. The process of claim 1 wherein said polymerizable monovinylidene monomer formulation and monovinylidene polymer consist at least principally of a monovinylidene aromatic hydrocarbon and a comonomer selected from the group consisting of lower alkyl acrylates and lower alkyl alkacrylates.

11. The process of claim 2 wherein the amount of monovinylidene polymer is about 10.0 to 19.0 percent by weight of the total of the polymer and monomer formulation combined.

12. The process of claim 1 wherein said polymerization en masse is continued until the total monovinylidene polymer content in the admixture comprises not more than about 50 percent by weight of the combined total of the monovinylidene polymer and vinylidene monomer and wherein said partially polymerized admixture is thereafter suspended in an aqueous medium and subjected to polymerization conditions to produce additional polymerization of said monomer formulation to obtain the desired degree of total polymerization.

13. In a process for producing a graft interpolymer of a monovinylidene compound upon a rubber substrate, the steps comprising admixing a graftable rubbery polymer containing a rubber-forming diene monomer and having a molecular weight of about 30,000 to 110,000 with a polymerizable monovinylidene monomer formulation and a monovinylidene polymer to obtain a two phase system wherein the continuous phase comprises a solution of the rubbery polymer in the vinylidene monomer formulation and the dispersed phase comprises a solution of the monovinylidene polymer in the vinylidene monomer formulation, said rubbery polymer comprising 2.0 to 60.0 percent by weight of the admixture, said monovinylidene polymer being present in an amount of about 10.0 to 19.0 percent by weight of the combined total of said monovinylidene polymer and monomer formulation but about 0.5 to 4.0 by weight of said combined total of monovinylidene polymer and monomer less than the amount of said monovinylidene polymer required to produce inversion of said phases, said monovinylidene monomer formulation and polymer consisting at least principally of a monovinylidene aromatic hydrocarbon; subjecting said admixture to polymerization en masse to produce graft polymerization of said monovinylidene monomer upon said rubbery polymer and to produce inversion of said phases with said solution of the rubbery polymer in the monomer formulation becoming the dispersed phase with the total monovinylidene polymer content being not more than about 50.0 percent by weight of the total amount of monovinylidene monomer and polymer combined in the admixture, the particles of the dispersed phase having a size of about 0.7 to 20.0 microns, said polymerization being conducted with control of agitation so as to avoid any substantial reduction of particle size of the rubber dispersion and graft copolymer; suspending said inverted phase admixture in an aqueous medium; and thereafter subjecting said suspension to polymerization conditions to produce additional polymerization of said monomer formulation to the desired degree of total polymerization.

14. The process of claim 13 wherein said polymerizable monovinylidene monomer formulation and monovinylidene polymer consist at least principally of a monovinylidene aromatic hydrocarbon and an ethylenically unsaturated nitrile.

15. The process of claim 13 wherein said monovinylidene aromatic hydrocarbon is styrene.

16. The process of claim 14 wherein said unsaturated nitrile is acrylonitrile.

17. The process of claim 13 wherein said rubbery polymer contains at least 75 percent by weight of a conjugated 1,3-diene.

18. The process of claim 13 wherein the rubbery polymer is admixed with a partially prepolymerized monovinylidene monomer formulation providing both said polymerizable monovinylidene monomer formulation and said monovinylidene polymer.

19. The process of claim 13 wherein said polymerizable monovinylidene monomer formulation and monovinylidene polymer consist at least principally of a monovinylidene aromatic hydrocarbon and a comonomer selected from the group consisting of lower alkyl acrylates and lower alkyl alkacrylates.

References Cited

UNITED STATES PATENTS

| | | | |
|---|---|---|---|
| 3,018,268 | 1/1962 | Daly | 260—876 |
| 3,029,223 | 4/1962 | Hibbard | 260—880 |
| 3,144,420 | 8/1964 | Fryling | 260—880 XR |
| 3,267,178 | 8/1966 | Lee | 260—880 |
| 3,278,642 | 10/1966 | Lee | 260—880 |
| 3,311,676 | 3/1967 | Toekes | 260—880 |
| 3,330,786 | 7/1967 | Finestone et al. | 260—880 XR |

SAMUEL H. BLECH, Primary Examiner

K. E. KUFFNER, Assistant Examiner

U.S. Cl. X.R.

260—4, 876, 878, 880

UNITED STATES PATENT OFFICE
CERTIFICATE OF CORRECTION

Patent No. 3,488,743            Dated = January 6, 1970

Inventor(s) MASSIMO BAER & CHIN HWEI LU

It is certified that error appears in the above-identified patent and that said Letters Patent are hereby corrected as shown below:

Column 2, line 38, "performed" should read --- preformed ---.

Column 5, after line 23 and before line 24, the following should be added --- polymerizable monomer formulations. By selection of ---.

Column 7, line 6, "hexyne-3-tert-butyl" should read --- hexyne-3, tert-butyl ---.

Example Five, after the Table insert --- 1. The lower the number, the better the surface. - - -

Claim 12, line 5, "vinylidene" should read --- monovinylidene ---.

SIGNED AND SEALED
AUG 18 1970

(SEAL)
Attest:
Edward M. Fletcher, Jr.
Attesting Officer

WILLIAM E. SCHUYLER, JR.
Commissioner of Patents